(12) United States Patent
Mizumura (10) Patent No.: US 11,935,259 B2
(45) Date of Patent: Mar. 19, 2024

(54) MICROSCOPE IMAGE MEASURING DEVICE AND MICROSCOPE IMAGE MEASURING METHOD

(71) Applicant: V TECHNOLOGY CO., LTD., Kanagawa (JP)

(72) Inventor: Michinobu Mizumura, Kanagawa (JP)

(73) Assignee: V TECHNOLOGY CO., LTD., Kanagawa (JP)

( * ) Notice: Subject to any disclaimer, the term of this patent is extended or adjusted under 35 U.S.C. 154(b) by 82 days.

(21) Appl. No.: 17/636,205

(22) PCT Filed: Jun. 22, 2020

(86) PCT No.: PCT/JP2020/024370
§ 371 (c)(1),
(2) Date: Feb. 17, 2022

(87) PCT Pub. No.: WO2021/033416
PCT Pub. Date: Feb. 25, 2021

(65) Prior Publication Data
US 2022/0284614 A1     Sep. 8, 2022

(30) Foreign Application Priority Data

Aug. 21, 2019   (JP) .................. 2019-151061

(51) Int. Cl.
*G06T 7/60*     (2017.01)
*G01B 11/24*    (2006.01)
(Continued)

(52) U.S. Cl.
CPC ............... *G06T 7/60* (2013.01); *G01B 11/24* (2013.01); *G06T 7/12* (2017.01); *G06T 7/13* (2017.01);
(Continued)

(58) Field of Classification Search
CPC .... G06T 7/60; G06T 7/12; G06T 7/73; G06T 7/13; G06T 2207/10056; G06T 2207/10148; G01B 11/24
See application file for complete search history.

(56) References Cited

U.S. PATENT DOCUMENTS 8,649,607 B1*   2/2014  Hayat .................. G06T 7/12
                                            382/199
2019/0180420 A1*  6/2019  Gutiérrez Medina .... G06T 5/50

FOREIGN PATENT DOCUMENTS

JP    H07-229720 A    8/1995
JP    H10-221607 A    8/1998
(Continued)

OTHER PUBLICATIONS

Office Action issued in corresponding Japanese Application No. 2019-151061; dated Apr. 4, 2023 (6 pages).
(Continued)

*Primary Examiner* — Shefali D Goradia
(74) *Attorney, Agent, or Firm* — Osha Bergman Watanabe & Burton LLP (57) ABSTRACT

In a measurement of a microscope image, a measurement can be conducted with high accuracy when measuring a measuring object including a step having a depth larger than a depth of focus or comparing patterns at different positions along the optical axis of a microscope. A microscope image measuring device includes: a microscope for obtaining a magnified image of a surface of a measuring object by irradiating the surface with white incident light; a spectral camera for obtaining a spectral image of the magnified image; and an image processing part for extracting the spectral image at each wavelength and performs an image measuring process. The microscope forms an image of a different focal position at each wavelength on the imaging surface of the spectral camera, and the image processing part extracts a spectral image with a wavelength where a measuring point has the highest contrast, and performs edge detection.

8 Claims, 7 Drawing Sheets

(51) Int. Cl.
  *G06T 7/12* (2017.01)
  *G06T 7/13* (2017.01)
  *G06T 7/73* (2017.01)

(52) U.S. Cl.
  CPC ...... *G06T 7/73* (2017.01); *G06T 2207/10056* (2013.01); *G06T 2207/10148* (2013.01)

(56) References Cited

FOREIGN PATENT DOCUMENTS

| JP | H10-293834 A | 11/1998 |
| JP | H11-132716 A | 5/1999 |
| JP | 2006-337701 A | 12/2006 |
| JP | 2008-014646 A | 1/2008 |
| JP | 2017-049036 A | 3/2017 |
| JP | 2018010021 A | 1/2018 |

OTHER PUBLICATIONS

Written Opinion issued in corresponding International Application No. PCT/JP2020/024370 dated Sep. 1, 2020 (6 pages).
International Search Report issued in corresponding International Application No. PCT/JP2020/024370 dated Sep. 1, 2020 (5 pages).
Office Action issued in counterpart Japaense Patent Application No. JP 2019-151061 dated Aug. 1, 2023 (7 pages).
Office Action issued in corresponding Japanese Application No. 2019-151061; dated Nov. 28, 2023 (7 pages).

\* cited by examiner

MICROSCOPE IMAGE MEASURING DEVICE AND MICROSCOPE IMAGE MEASURING METHOD

TECHNICAL FIELD

The present invention relates to a microscope image measuring device and a measuring method.

BACKGROUND ART

A known microscope image measuring device measures the dimensions and shapes of parts on the surface of a measuring object by imaging a microscope magnified image of the surface of the measuring object by means of an imaging apparatus and detecting the edges of the acquired image (for example, see PTL 1).

CITATION LIST

Patent Literature

[PTL 1] Japanese Patent Application Publication No. 2017-49036

SUMMARY OF INVENTION

Technical Problem

Such a microscope image measuring device acquires an image of the surface of a measuring object by forming, on the imaging surface of an imaging apparatus, an image of a two-dimensional plane on the measuring object orthogonal to the optical axis of a microscope. The microscope image measuring device detects a position to be measured, according to the contrast of the image. Thus, a measuring object including surface steps having a depth larger than the depth of focus of the microscope may form a two-dimensional image containing in-focus portions and blurry and out-of-focus portions. If a blurry portion is a position to be measured, the position is not possible to be detected with high accuracy, resulting in a large measurement error.

In this case, the focal point of the microscope is possible to be adjusted to a different point along the optical axis. However, an image in a different state is acquired after the movement of an optical system, and thus various errors associated with the movement of the optical system are added to the measurement. This prevents accurate measurement.

Moreover, if a measuring object is a multi-layer film, it may be required to compare the pattern shapes of layers. In this case, if the film includes a transparent layer, an overlapping state of the pattern shapes of the layers is possible to be acquired as a two-dimensional image. However, if a distance between the layers of patterns to be compared is larger than a depth of focus, as described in the foregoing problem, focusing on the pattern of one layer may bring the pattern of another layer out of focus. Thus, the patterns are not possible to be accurately compared with each other.

The present invention is proposed to address the problem. Specifically, in a measurement of a microscope image, an object of the present invention is to conduct a measurement with high accuracy when measuring a measuring object including a step having a depth larger than a depth of focus or comparing patterns at different positions along the optical axis of a microscope.

Solution to Problem

In order to solve the problem, the present invention is configured as follows:

A microscope image measuring device including: a microscope for obtaining a magnified image of a surface of a measuring object by irradiating the surface with white incident light; a spectral camera for obtaining a spectral image of the magnified image; and an image processing part for extracting the spectral image at each wavelength and performing an image measuring process, characterized in that the microscope forms an image of a different focal position at each wavelength on the imaging surface of the spectral camera, and the image processing part extracts a spectral image with a wavelength where a measuring point has a highest contrast, and performs edge detection.

DESCRIPTION OF EMBODIMENTS

Embodiments of the present invention will be described below with reference to the accompanying drawings. Hereinafter, duplicate reference numerals in different drawings denote parts having the same functions, and a redundant explanation thereof in the drawings is optionally omitted.

Figure 1:
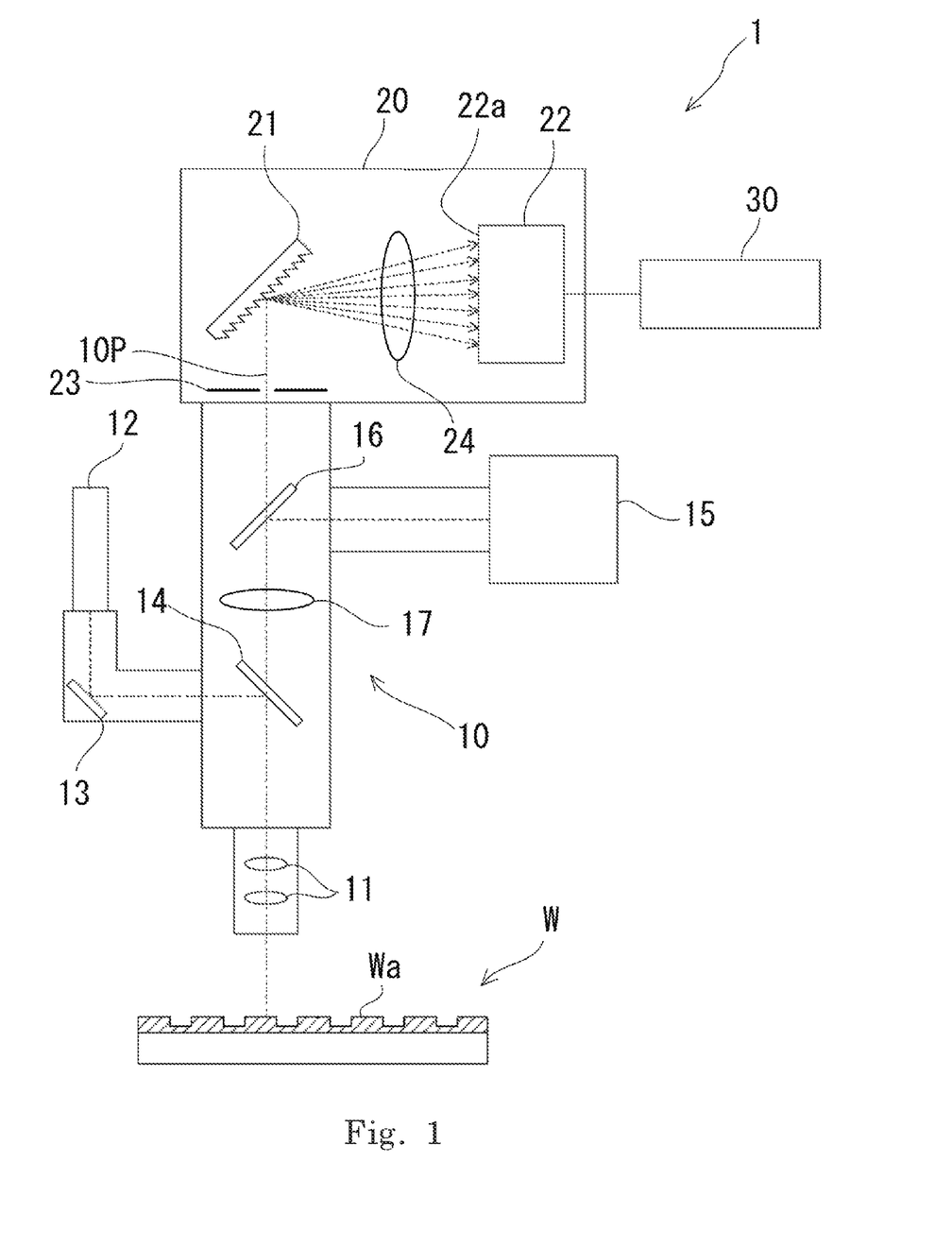
FIG. 1 is an explanatory drawing illustrating a microscope image measuring device according to an embodiment of the present invention.

As illustrated in FIG. 1, a microscope image measuring device 1 measures a distance between measuring points on a surface Wa of a measuring object W or compares patterns. The microscope image measuring device 1 includes a microscope 10, a spectral camera 20, an image processing part 30. The measuring object W is a substrate having steps to be measured on the surface Wa or a multi-layer film substrate having a pattern to be measured in each layer.

The microscope 10 is an optical microscope that irradiates the surface Wa of the measuring object W with white incident light and obtains a magnified image of the surface Wa. The microscope 10 is provided with an optical system including objective lenses 11 and a tube lens 17, a white light source 12 for irradiating the surface Wa with white incident light, and an optical system (a mirror 13 and a half mirror 14) thereof. Moreover, the microscope 10 optionally includes a monitor camera 15 for obtaining a monitor image for a magnified image of the surface Wa and an optical system (half mirror 16) for the monitor camera 15.

The spectral camera 20 including a slit 23 and a grating element (diffraction grating) 21 on an optical axis 10P of the optical system of the microscope 10 separates wavelengths of light reflected from the surface Wa, images the separated light on an imaging surface 22a of a two-dimensional camera 22 via a relay lens system 24, and acquires a spectral image for a magnified image of the surface Wa at each wavelength according to line spectroscopy.

The image processing part 30 measures a distance between measuring positions on the surface Wa or compares patterns by performing an image measuring process including edge detection on a spectral image acquired by the spectral camera 20 at each wavelength.

Figure 2:
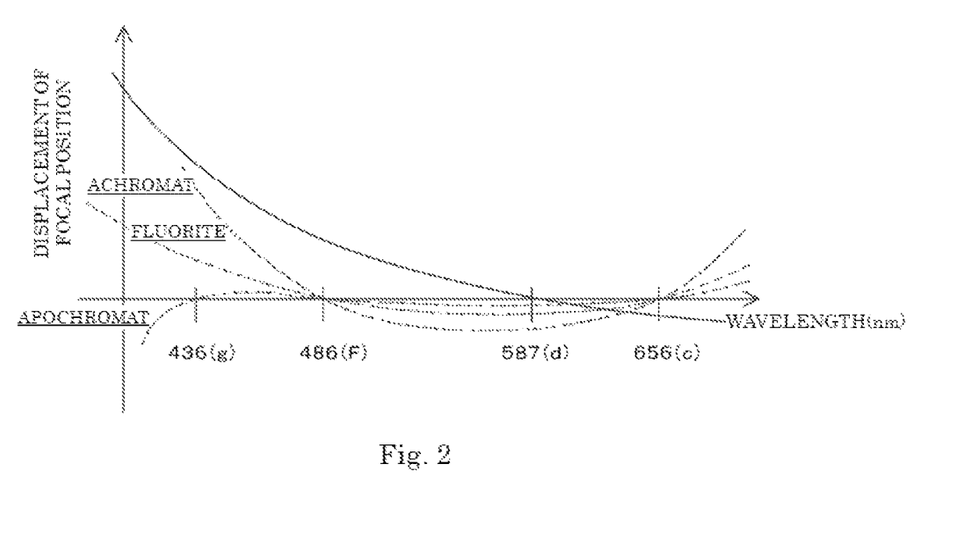
FIG. 2 is an explanatory drawing of the optical properties (chromatic aberration) of a microscope.

Various aberrations occur in the optical system of the microscope 10. The microscope 10 forms an image of a different focal position at each wavelength on the imaging surface 22a of the spectral camera 20 by positively using, in particular, a chromatic aberration. Typically, the objective lens of a microscope is aberration-corrected for a chromatic aberration as indicated by broken lines in FIG. 2. In corrections called an achromatic or fluorite correction, chromatic aberrations are corrected for two colors of an F line (a wavelength of 486 nm) and a c line (a wavelength of 656 nm). In an apochromatic correction, chromatic aberrations are corrected for three colors of a g line (436 nm), an F line, and a c line. In this configuration, the fluorite or apochromatic correction relatively suppresses a displacement of a focal position at each wavelength, whereas in the achromatic correction for colors other than the corrected two colors, a displacement of a focal position at each wavelength is relatively large. The optical system of the microscope 10 is possible to form an image at a different focal position at each wavelength on the imaging surface 22a of the spectral camera 20 by using a lens system in which an achromatic correction is made with a relatively large displacement of a focal position at each wavelength or a lens system in which a displacement of a focal position at each wavelength is relatively large as indicated by a solid line in FIG. 2.

Figure 3:
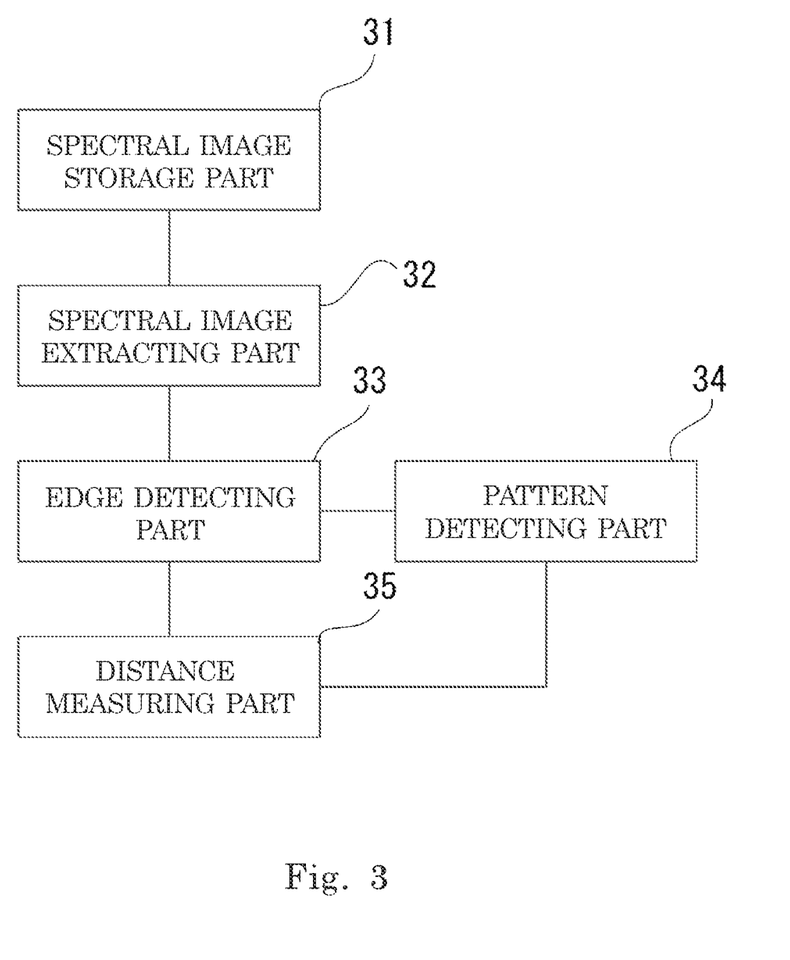
FIG. 3 is an explanatory drawing of the functions of an image processing part.

As illustrated in FIG. 3, the functions of the image processing part 30 include, for example, a spectral image storage part 31, a spectral image extracting part 32, an edge detecting part 33, a pattern detecting part 34, and a distance measuring part 35.

The spectral image storage part 31 stores a spectral image at each wavelength in memory at any time, the spectral image being outputted from the two-dimensional camera 22 of the spectral camera 20. The spectral image extracting part 32 extracts a spectral image with a wavelength where the measuring point has the highest contrast, from among spectral images stored at respective wavelengths in the spectral image storage part 31.

The edge detecting part 33 detects an edge at the measuring point by performing image processing on the spectral image extracted by the spectral image extracting part 32, and stores the position of the edge in the memory. If the edge detecting part 33 detects a plurality of edge points, the pattern detecting part 34 detects a pattern connecting the edge points and stores the position of the pattern in the memory. The distance measuring part 35 measures a distance between edges detected by the edge detecting part 33 or a distance between patterns detected by the pattern detecting part 34.

Figure 4:
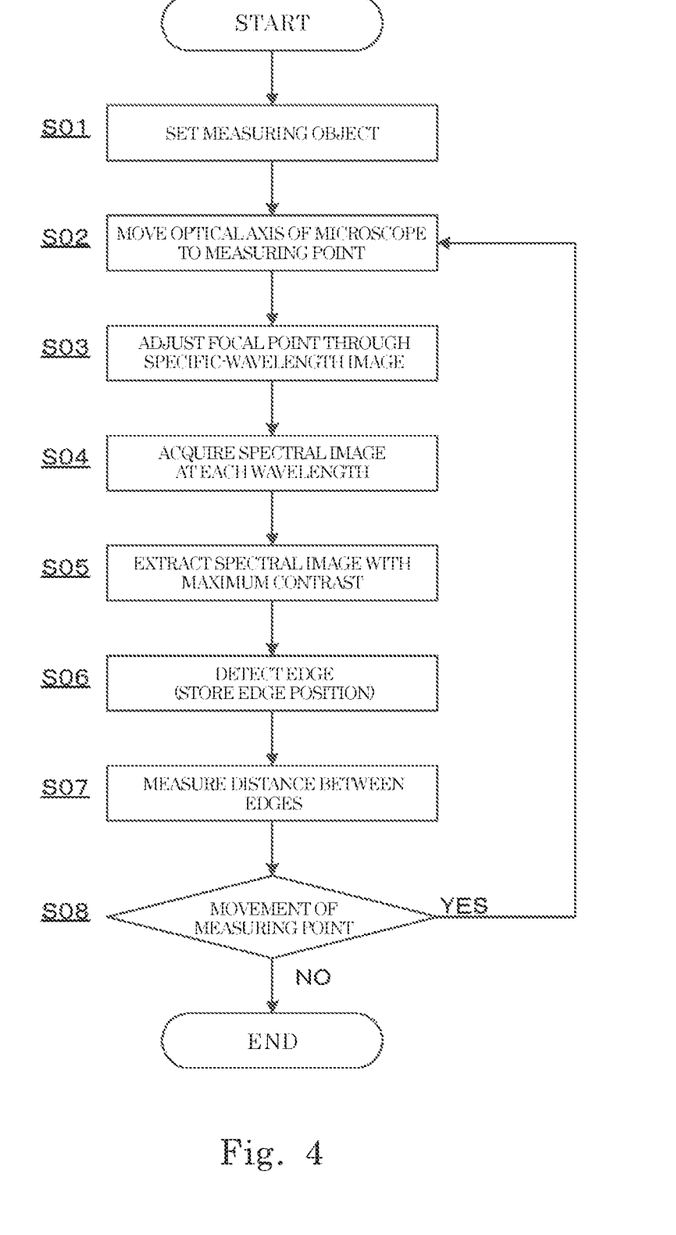
FIG. 4 is a flowchart of an example of a microscope image measuring method.
Figure 5:
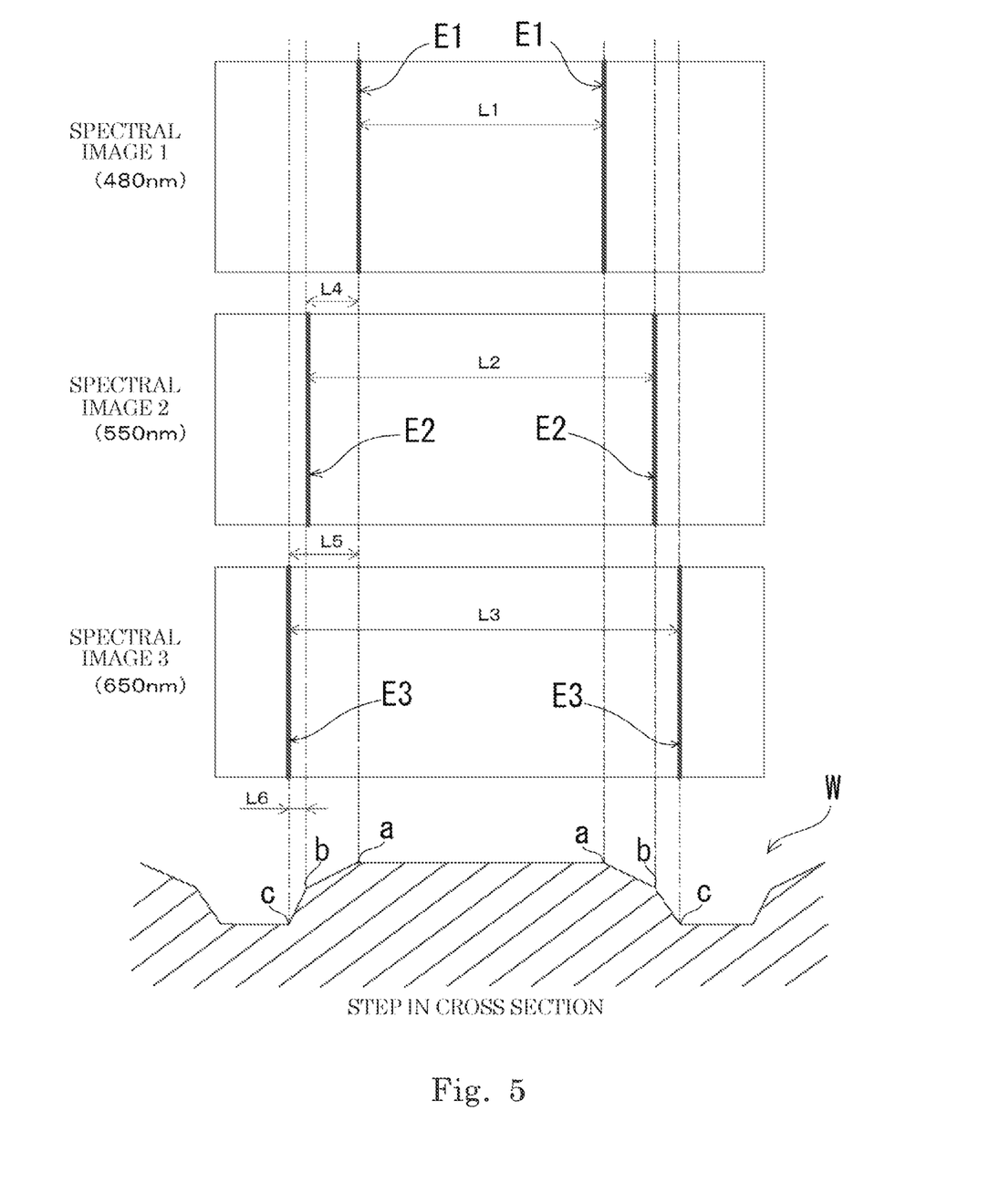
FIG. 5 is an explanatory drawing of an example of the microscope image measuring method.

Referring to FIGS. 4 and 5, an example of measurement by the microscope image measuring device 1 will be described below. In this example, the measuring object W is a substrate having steps in cross section (for example, a TFT substrate or a color filter substrate) as illustrated in FIG. 5. The depths of the steps are equal to or greater than the depth of focus of the microscope 10.

At the start of measurement, first, the measuring object W is set at a stage or the like for measurement (step S01), and the optical axis 10P of the microscope 10 is moved to a measuring point on the surface Wa of the measuring object W (step S02). Subsequently, a focal point is adjusted through a specific-wavelength image while viewing the monitor output of the spectral camera (step S03).

Thereafter, the spectral camera 20 acquires a spectral image at each wavelength at the measuring point, and the acquired spectral image is transmitted to the image processing part 30 (step S04). In the image processing part 30, the spectral image storage part 31 stores an acquired spectral image at each wavelength, and the spectral image extracting part 32 extracts a spectral image with a wavelength where the measuring point has the highest contrast. In the example illustrated in FIG. 5, a spectral image 1 with a wavelength of 480 nm is extracted as a spectral image having a maximum contrast at point a, a spectral image 2 with a wavelength of 550 nm is extracted as a spectral image having a maximum contrast at point b, and a spectral image 3 with a wavelength of 650 nm is extracted as a spectral image having a maximum contrast at point c (step S05).

Subsequently, an edge is detected by using the extracted spectral image, and a detected edge position is stored in the memory (step S06). In the edge detection, a position where a contrast rapidly changes on an image is detected as an edge, and the position on the image is stored in the memory. In the example illustrated in FIG. 5, edges E1 are detected in the edge detection using the spectral image 1, edges E2 are detected in the edge detection using the spectral image 2, and edges E3 are detected in the edge detection using the spectral image 3.

Furthermore, a desired dimensional distance or shape distance is measured by measuring a distance between the detected edges (step S07). In the example illustrated in FIG. 5, a distance between the two points a on the same plane (at the same height) is possible to be measured by measuring a distance L1 between the edges E1 in the spectral image 1, a distance between the two points b on the same plane (at the same height) is possible to be measured by measuring a distance L2 between the edges E2 in the spectral image 2, and a distance between the two points c on the same plane (at the same height) is possible to be measured by measuring a distance L3 between the edges E3 in the spectral image 3.

Moreover, the spectral images 1 to 3 are obtained by wavelength separation on the image of a magnified image that is captured without moving the optical system of the microscope 10, so that the relationship among the relative positions of the spectral images 1 to 3 does not include a displacement or the like that is caused by a movement of the optical system of the microscope. Thus, horizontal distances at different heights are possible to be measured by comparing distances between edges detected in spectral images with different wavelengths. For example, in the example illustrated in FIG. 5, a horizontal distance between the point a and the point b is possible to be measured by measuring a distance L4 between the edge E1 in the spectral image 1 and the edge E2 in the spectral image 2, a horizontal distance between the point a and the point c is possible to be measured by measuring a distance L5 between the edge E1 in the spectral image 1 and the edge E3 in the spectral image 3, and a horizontal distance between the point b and the point c is possible to be measured by measuring a distance L6 between the edge E2 in the spectral image 2 and the edge E3 in the spectral image 3.

Thereafter, in a movement to a subsequent measuring point (step S08: "YES"), the optical axis of the microscope 10 is moved to the subsequent measuring point, and the processing from step S02 is continued. If the optical axis is not moved to the subsequent measuring point (step S08: "NO"), the processing is terminated.

Figure 6:
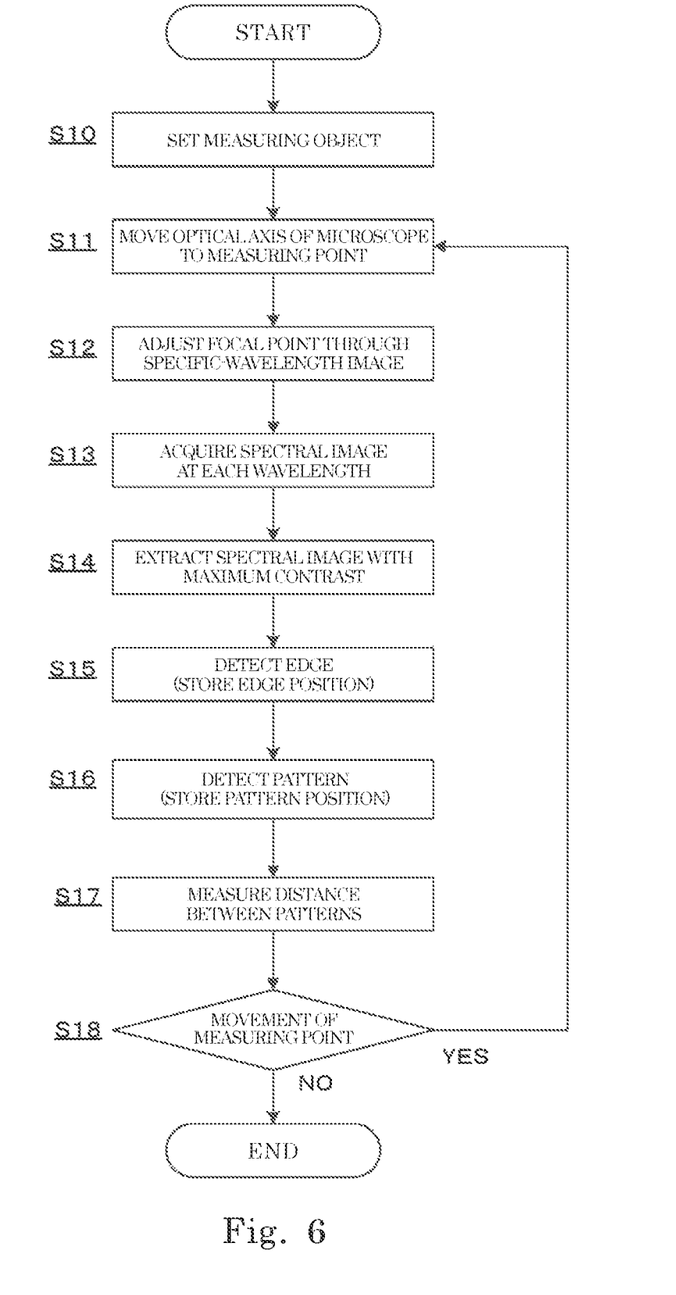
FIG. 6 is a flowchart of another example of the microscope image measuring method.
Figure 7:
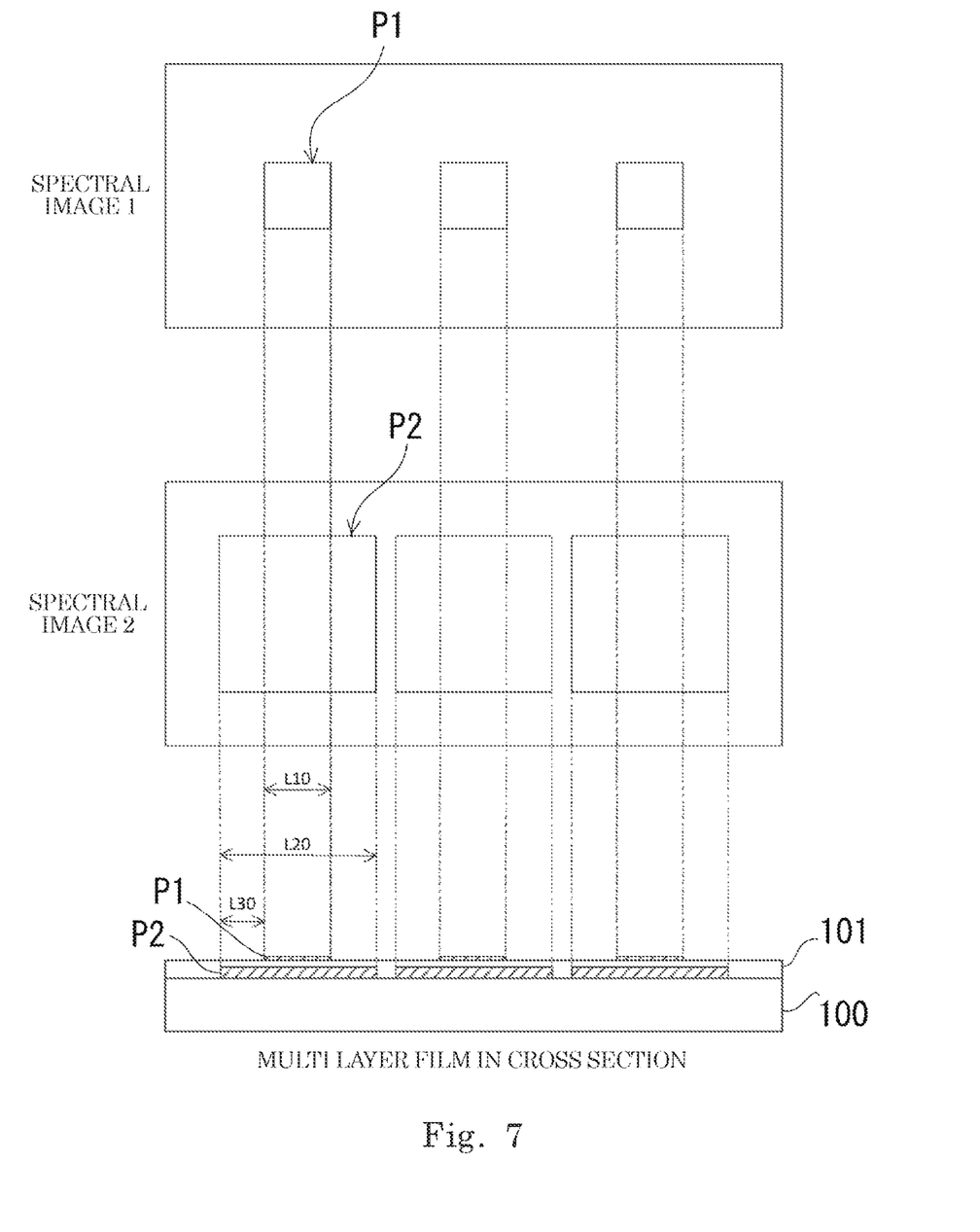
FIG. 7 is an explanatory drawing of another example of the microscope image measuring method.

Referring to FIGS. 6 and 7, another example of measurement by the microscope image measuring device 1 will be described below. In this case, as illustrated in FIG. 7, the measuring object W is a multi-layer film substrate having patterns P1 and P2 on different layers. Relative positions between the patterns P1 and P2 on the different layers are compared with each other. At this point, the different layers have an interlayer distance that is equal to or greater than the depth of focus of the microscope 10. FIG. 7 illustrates an example of the measuring object W in which the layer of the pattern P2 is formed on a substrate 100 and the layer of the pattern P1 is stacked thereon with a transparent layer 101 interposed between the layers of the patterns P1 and P2.

Steps S10 to S13 in FIG. 6 are identical to the foregoing steps S01 to S04. In step S14, the spectral image 1 is extracted with a wavelength where the pattern P1 has a maximum contrast, and the spectral image 2 is extracted with a wavelength where the pattern P2 has a maximum contrast.

Subsequently, edges are detected by using the extracted spectral images 1 and 2, and detected edge positions are stored in the memory (step S15). Moreover, patterns are detected by connecting detected edge points, and then detected pattern positions are stored in the memory (step S16). In the example illustrated in FIG. 7, the position of the pattern P1 is detected by using the spectral image 1, and the position of the pattern P2 is detected by using the spectral image 2.

In step S17, a distance between the patterns is measured by comparing the relative positions of the pattern P1 connecting edge points detected in the spectral image 1 with a wavelength and the pattern P2 connecting edge points detected in the spectral image 2 with another wavelength. In the example illustrated in FIG. 7, a width L10 of the pattern P1 is possible to be measured by the pattern P1 detected in the spectral image 1, and a width L20 of the pattern P2 is possible to be measured by the pattern P2 detected in the spectral image 2. A distance L30 is possible to be measured by comparing the relative positions of the pattern P1 and the pattern P2.

Thereafter, as in the foregoing example, in a movement to a subsequent measuring point (step S18: "YES"), the optical axis of the microscope 10 is moved to the subsequent measuring point, and the processing from step S11 is continued. If the optical axis is not moved to the subsequent measuring point (step S18: "NO"), the processing is terminated.

As described above, the microscope image measuring device and the microscope image measuring method according to the embodiment of the present invention positively use the chromatic aberration of the microscope 10, so that images at different positions along the optical axis are acquired without moving the optical system of the microscope 10, and edge detection is performed on an image at each wavelength. Hence, a measurement is possible to be conducted with high accuracy when measuring a measuring object including a step having a depth larger than a depth of focus or comparing patterns at different positions along the optical axis of the microscope.

The embodiments of the present invention were specifically described with reference to the accompanying drawings. The specific configuration is not limited to the foregoing embodiments. The present invention includes design changes without departing from the spirit of the invention. The techniques of the foregoing embodiments are possible to be used in combination unless contradictions or problems occur in the objects and configurations.

REFERENCE SIGNS LIST

1 Microscope image measuring device
10 Microscope
10P Optical axis
20 Spectral camera
30 Image processing part
11 Objective lens
12 White light source
13 Mirror
14, 16 Half mirror
15 Monitor camera
17 Tube lens
21 Grating element (diffraction grating)
22 Two-dimensional camera
22a Imaging surface
23 Slit
24 Relay lens system
31 Spectral image storage part
32 Spectral image extracting part
33 Edge detecting part
34 Pattern detecting part
35 Distance measuring part
100 Substrate
101 Transparent layer
E1 to E3 Edge
P1, P2 Pattern
W Measuring object
Wa Surface

What is claimed is:

1. A microscope image measuring device comprising:
a microscope for obtaining a magnified image of a surface of a measuring object by irradiating the surface with white incident light;
a spectral camera for obtaining a spectral image of the magnified image; and
an image processing part for extracting the spectral image at each wavelength and performing an image measuring process,
wherein the microscope forms an image of a different focal position at each wavelength on an imaging surface of the spectral camera, and
the image processing part extracts the spectral image with a wavelength where a measuring point has a highest contrast, and performs edge detection.

2. The microscope image measuring device according to claim 1, wherein the image processing part measures a distance between edges detected in spectral images with different wavelengths.

3. The microscope image measuring device according to claim 1, wherein the image processing part compares relative positions of a pattern connecting edge points detected in a spectral image with a wavelength and a pattern connecting edge points detected in a spectral image with another wavelength.

4. A microscope image measuring method comprising the steps of:
obtaining a magnified image of a surface of a measuring object with a microscope by irradiating the surface with white incident light, and obtaining a spectral image of the magnified image with a spectral camera; and
extracting the spectral image at each wavelength and performing an image measuring process,
wherein the microscope forms an image of a different focal position at each wavelength on an imaging surface of the spectral camera, and an image processing part extracts the spectral image with a wavelength where a measuring point has a highest contrast, and performs edge detection.

5. The microscope image measuring method according to claim 4, wherein in the image measuring process, a distance is measured between edges detected in spectral images with different wavelengths.

6. The microscope image measuring method according to claim 4, wherein in the image measuring process, a comparison is made between relative positions of a pattern connecting edge points detected in a spectral image with a wavelength and a pattern connecting edge points detected in a spectral image with another wavelength.

7. The microscope image measuring method according to claim 4, wherein the measuring object is a substrate with a surface step having a depth equal to or greater than a depth of focus of the microscope.

8. The microscope image measuring method according to claim 4, wherein the measuring object is a multi-layer film substrate having a pattern to be measured in each layer having a depth equal to or greater than a depth of focus of the microscope.

* * * * *